United States Patent [19]

Hemens

[11] 3,838,607

[45] Oct. 1, 1974

[54] STEERING SYSTEMS

[75] Inventor: James Frederick Hemens, Billericay, England

[73] Assignee: Teleflex Limited, Basildon, England

[22] Filed: Mar. 8, 1973

[21] Appl. No.: 339,343

[30] Foreign Application Priority Data
May 11, 1972  Great Britain.................. 22241/72

[52] U.S. Cl. .............. 74/496, 74/501 R, 74/501 P, 74/424.8 A
[51] Int. Cl. ........................................... B62d 1/20
[58] Field of Search......... 74/496, 501 R, 501 P, 424.8 A, 74/505

[56] References Cited
UNITED STATES PATENTS

| | | | |
|---|---|---|---|
| 1,821,404 | 9/1931 | Rapellin.................. | 74/424.8 A |
| 2,787,917 | 4/1957 | Schroeder................. | 74/501 R X |
| 3,013,443 | 12/1961 | Morse.................... | 74/501 P |
| 3,101,821 | 8/1963 | Henry.................... | 74/501 R X |
| 3,206,998 | 9/1965 | Matz, Jr. et al............ | 74/501 R X |
| 3,242,691 | 3/1966 | Robinson et al............ | 74/501 R X |
| 3,258,989 | 7/1966 | Frese et al................ | 74/501 R |
| 3,766,801 | 10/1973 | Niegand.................. | 74/496 X |

*Primary Examiner*—Samuel Scott
*Assistant Examiner*—F. D. Shoemaker

[57] ABSTRACT

A steering head assembly comprising a cable wheel rotatably mounted on a depending hub forming a part of a housing being open at its underside to permit attachment of a cable wheel, a back plate covering the base of the housing, a cable wheel having helically grooved annular recesses in its periphery adapted to drivingly engage a helical wound cable such that rotation of the cable wheel causes translational movement of the cable, the housing provided with a plurality of openings through which the cable moves, the cable wheel being internally toothed for driving engagement with a pinion gear, the pinion being formed in one piece with and at its lower end of a shaft with the pinion being journaled for rotatable movement in the housing, the shaft having relatively larger and smaller diameter regions which make bearing contact with the bearing surface presented by the housing.

2 Claims, 4 Drawing Figures

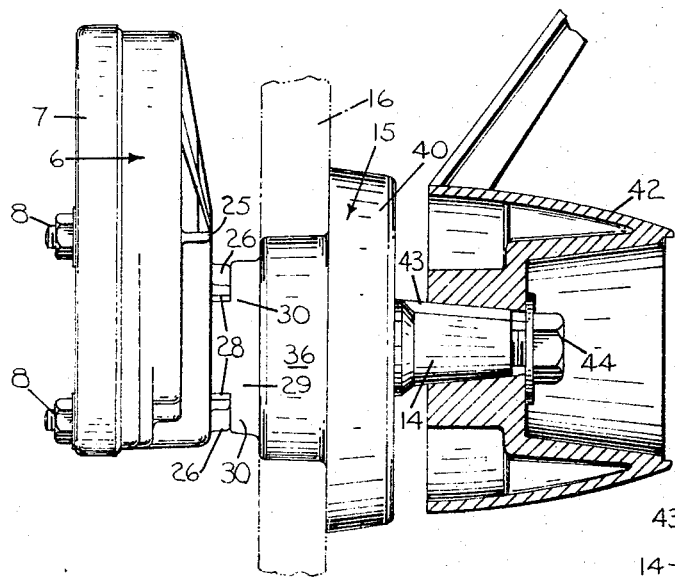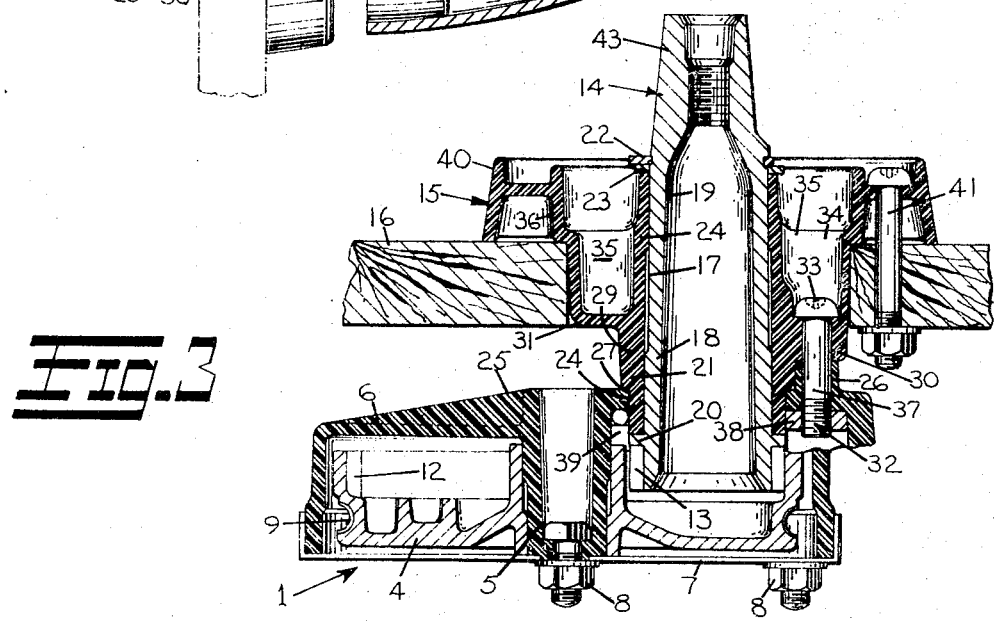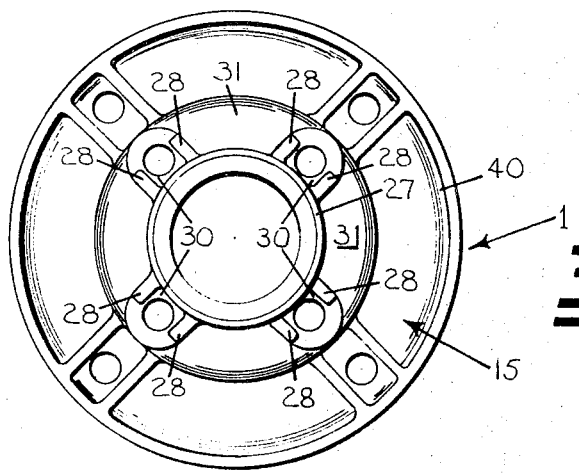

STEERING SYSTEMS

This invention relates to steering systems and has particular, but not exclusive, reference to marine craft steering systems employed with a push-pull cable mechanism to transmit steerage motion to the tiller of a boat.

A prior such marine craft steering system incorporates a steering head having a housing structure within which is rotatably mounted a cable wheel making driving engagement at its periphery with a helically wound cable in the manner of a rack and pinion drive to effect translational motion of the cable. The internal periphery of the cable wheel is toothed, and a shaft having affixed thereto a separate pinion extends into the housing structure with the pinion in meshing engagement with the toothed wheel. The shaft is journalled in a pair of bearing sleeves mounted respectively in a hollow metal pillar and an upper plastics shroud. Between the bearing sleeves, the shaft extends through a tubular member and is held in position by a circlip located between that member and the sleeve positioned in the upper shroud. One end of the pillar is mounted on the housing structure, and the upper shroud is mounted on the opposite end of the pillar. The upper shroud is bolted through the pillar to the housing structure by which all these components are secured together. The steering head is completed by a lower plastics shroud bolted to the underside of the upper shroud and adapted to be bolted to the instrument panel by which to secure the steering head thereto.

The described steering head is, as will be appreciated, of somewhat complicated construction although perfectly satisfactory in operation. We have now devised a steering head of considerably simpler construction which reduces assembly time and manufacturing costs.

One feature of the exemplary steering head to be described is that the shaft and pinion are integral with each other. Another feature is that the tubular pillar and two part shroud structure is replaced by a one piece plastics body in which the shaft is directly journalled and which is adapted for securement to the instrument panel.

We have also devised a means of strengthening the helically wound cable where such cable is unsupported without affecting the ability of the cable to flex, such means comprising helically winding a filler wire between the convolutions of the cable.

These and other features and advantages of the invention will appear from the following description of one embodiment thereof, given by way of example only, reference being had to the accompanying drawing, in which:

FIG. 2 is a side elevation of the same steering head with a steering wheel (shown in section) operatively assembled thereto and shown mounted on the helm of a boat;

FIG. 3 is an axial section through the same steering head taken along the line III—III of FIG. 1 and showing the plastics body thereof affixed to the helm; and FIG. 4 is an underplan view of the plastics body depicted in FIG. 3.

Figure 1:
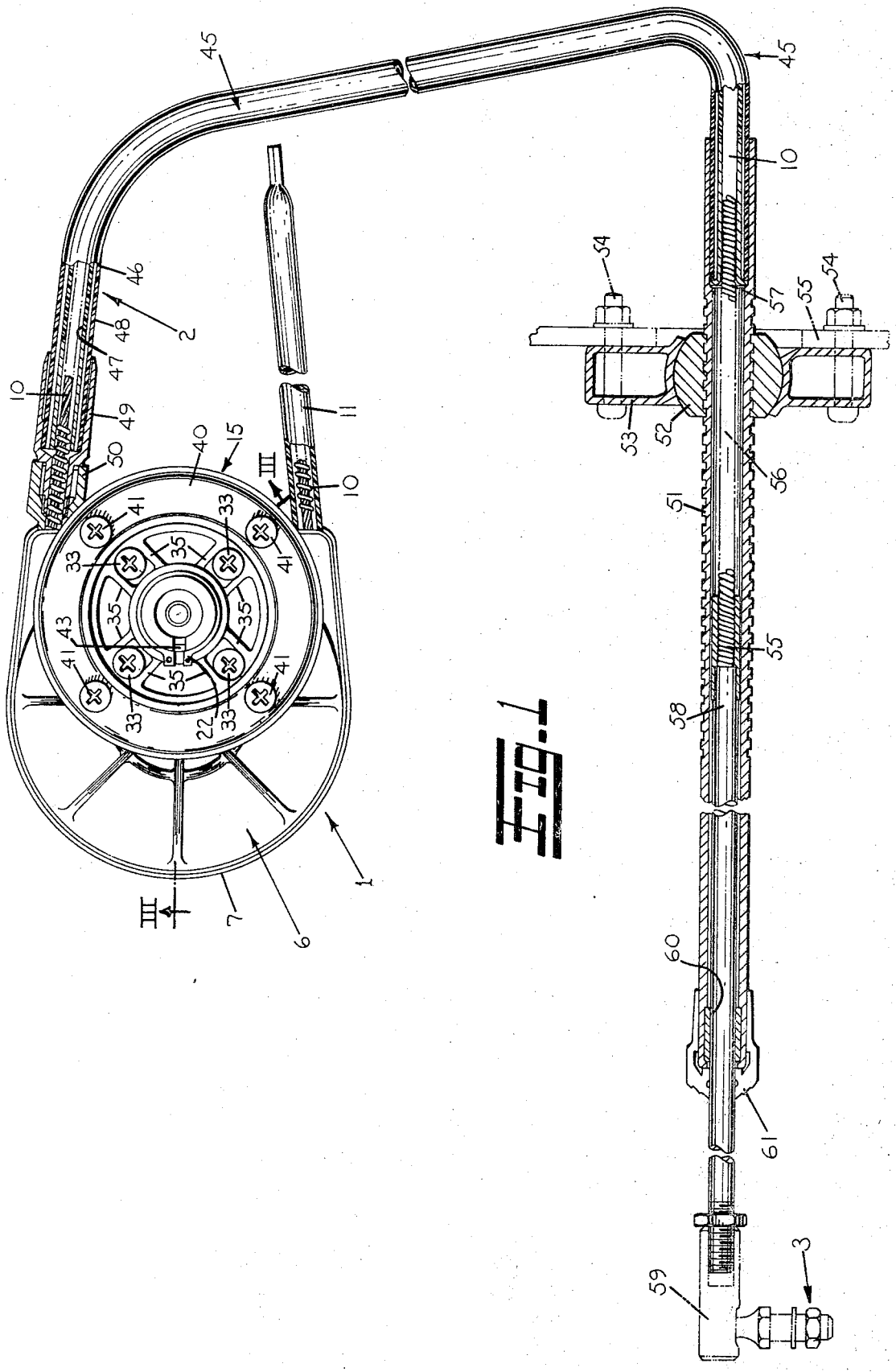
FIG. 1 is a view of a marine craft steering system comprising a steering head (shown in plan) operatively connected by a push-pull cable mechanism (shown in axial section and partly diagrammatically) to a tiller mounting.

In the FIGS. the steering head, push-pull cable mechanism and tiller mounting are denoted generally by reference numerals 1, 2 and 3 respectively.

The steering head 1 comprises a cable wheel 4 which is rotatably mounted on a depending hub 5 forming part of a plastics housing 6 which is open at its underside to permit fitment of the cable wheel. A metal back plate 7 covers the base of the housing 6 and is attached thereto by three nut and bolt assemblies 8.

The cable wheel 4 is fashioned with a helically grooved annular recess 9 in its periphery which makes driving engagement with an helically wound inner cable 10 (forming part of the push-pull cable mechanism 2) so that rotation of the cable wheel causes the cable to make translational movement. The housing 6 is provided with two openings extending tangentially to the annular recess 9 and through which the cable 10 moves as the cable wheel 4 rotates. A spent travel tube 11 is fitted to one of those openings to enclose the free end of the cable 10. The mounting of the cable 10 at its emergence from the other opening in the housing 6 will be described hereafter.

The cable wheel 4 is internally toothed at 12 for driven engagement with a pinion 13. A particularly noteworthy feature of the steering head 1 is that the pinion 13 is fashioned in one piece with, and at the lower end of, a shaft 14. Preferably, the shaft 14 with its pinion 13 is pressure die cast from a zinc alloy such that no machining operation is necessary in its production. This method of fashioning the shaft and pinion is considerably cheaper than making them separately by conventional machining techniques and thereafter securing them together.

Another feature of note is that the steering head 1 incorporates a plastics body 15 which serves the dual purpose of acting as a bearing support for the shaft 14 and also as shroud adapted to be mounted upon and fixed to the instrument panel 16 of a boat by which to secure the steering head thereto with the lower part of the head, including the housing 6 and the associated components, located behind the panel.

The body 15 includes a central vertical aperture 17 in which the shaft 14 is journalled, the shaft having larger and smaller diameter regions 18 and 19 respectively which make direct bearing contact with complementary bearing surfaces of the body aperture. Such a plastics journal bearing is long lasting owing to the low friction which is generated between the plastics material of the body 15 and the metal of the shaft 14.

The pinion 13 is of larger diameter than the shaft 14 and depends from a shoulder region 20 which abuts the lower end face of a spigot portion 21 of the body 15 to locate the shaft therein with the pinion in meshing engagement with the cable wheel teeth 12. The shaft 14 is held to the body 15 by a circlip 22 which engages in a groove in the upper extremity of the smaller diameter region 19 and bears against a thrust washer 23 abutting the upper end face of an internal tubular section 24 of the body.

The body 15 is mounted on the housing 6 with its spigot portion 21 spigotted into an aperture 24 moulded in the housing. The aperture 24 is offset relative to the hub 5 so that the pinion 13 will make driving engagement with the cable wheel 4. The housing 6 incorporates a flat mounting surface 25 around its aperture 24, and moulded integral with that surface to be upstanding therefrom are four square cross-section lugs 26 equally spaced about the aperture. The body 15 seats at a shoulder 27 on the mounting surface 25 and is fashioned to positively engage with each of the lugs 26. For that purpose, the body 15 is provided with four sets of paired radial fins 28 projecting from an intermediate tubular portion 29 of the body and each pair depending from a lug 30 which, in turn, depend from a radially extending rim 31 connecting that tubular portion with the tubular section 24. The fins 28 of each pair are spaced apart so as to fit closely upon a respective housing lug 26 with the body lugs 30 seated upon the corresponding lugs 26.

The body 15 is secured to the housing 6 by means of four screws 32, the heads 33 of which seat in wells 34 defined between radial fins 35 extending between the inner tubular section 24 and an outer tubular section 36 upstanding from and integral with the outer periphery of the rim 31. The threaded shanks 37 of those screws pass through aligned apertures in the mating lugs 26 and 30 to make threaded engagement with a metal plate 38 located within a complementary recess 39 formed in the housing 6.

The outer tubular body section 36 locates in an aperture formed in the instrument panel 16, and an annular flange structure 40 integral with the upper end of that tubular section seats against the panel to be secured thereto by four screw and nut assemblies 41. Thereby, the steering head 1 is fastened to the instrument panel 16.

Both the housing 6 and the body 15 are moulded in one piece of any suitable synthetic plastics material which may be, for example, acetal resin.

A steering wheel 42 is mounted on the upper end of the shaft 14, which incorporates a moulded-in key 43 engaging a keyway in the wheel, and is bolted at 44 thereto, so that rotation of the wheel will rotate the pinion 13 and the meshing cable wheel 4 and cause a translational movement of the inner cable 10.

The inner cable 10 comprises the core (and will hereinafter be referred to as such) of the push-pull cable mechanism 2 which incorporates a casing, generally indicated by the reference 45, within which the core slidably reciprocates to transmit mechanical motion to the tiller (not shown) while at least the ends of the casing are clamped in a relatively fixed position with respect to the core.

In the exemplary construction depicted, the casing 45 is formed of a plurality of casing wires 46 laid contiguously, in the form of a long pitched helical coil, about the peripheral surface of an inner, flexible plastics tube 47 (within which the core 10 is guided), an outer plastics jacket 48 encasing the coil of wires 46. A metal ferrule 49 is positioned over one end of the casing 45 and is cold swaged, or otherwise suitably connected, thereon. The ferrule 49 is screwed into a metal hub 50 which is fitted into the upper opening in the housing 6 and is suitably secured thereto to clamp the associated end of the casing 45 relative to the steering head.

An externally threaded metal guide conduit 51 is cold swaged, or otherwise suitably connected, on the opposite end of the casing 45 thereby to restrain that end from moving axially with the core 10. The conduit 51 includes a series of axially spaced annular grooves in its periphery and is supported in a similarly grooved bore of a split ball structure 52, the arrangement being such that the conduit can be set in any of a number of different axial positions within the bore and fixed in the adjusted position by clamping the ball structure thereto. The same result could be obtained by fashioning the conduit and the ball structure so that they make screwthreaded engagement. With both constructions, the conduit 51 is capable of both longitudinal and universal angular adjustment. The swivel ball structure 52 is mounted in a housing 53 bolted at 54 to the transom 55 of the boat.

The core 10 extends longitudinally outwardly of the casing 45 to be engaged within a metal sleeve 55 which preferably would be cold swaged on to the core end. Between the end of the casing 45 and the sleeve 55, the core 10 is unsupported (over its length 56) and it is a further feature of this steering system that a filler wire 57 is wound onto the core between the helical convolutions thereof to strengthen the core to take a compressive loading without making the core so rigid that it is not sufficiently flexible to be capable of bending to enter the conduit 51.

The sleeve 55 is fast with a metal rod 58 which extends through the conduit 51 and is secured to a fitment 59 serving as the tiller mounting 3. The rod 58 is supported for sliding movement in the conduit 51 by a journal bearing sleeve 60, and a seal 61, which desirably is as featured in our copending patent application Ser. No. 18896/72 is provided between the rod and the conduit to prevent the ingress of any foreign matter, including water, into the conduit and the escape of any lubricant therefrom. The sleeve 55 serves to restrict the degree of travel available to the rod 58 and core 10 by engaging the bearing sleeve 60 at the limit of outgoing travel and the casing 45 at the limit of ingoing travel.

I claim:

1. A steering head assembly comprising a cable wheel rotatably mounted on a depending hub forming a part of a housing being open at its underside to permit attachment of a cable wheel, a back plate covering the base of said housing and attached thereto by attaching means, said cable wheel having helically grooved annular recesses in its periphery adapted to drivingly engage a helical wound cable such that rotation of the cable wheel causes translational movement of said cable, said housing provided with a plurality of openings through which said cable moves, said cable wheel being internally toothed for driving engagement with a pinion gear, said pinion being formed in one piece with and at its lower end of a shaft with said pinion being journaled for rotatable movement in said housing, said shaft having relatively larger and smaller diameter regions which make bearing contact with the bearing surface presented by said housing, said pinion is of larger diameter than said shaft and depends from a shoulder region which abuts the lower end face of a spigot portion of said housing to locate said shaft therein with said pinion in meshing engagement with complementary teeth on said cable wheel.

2. A steering head assembly in accordance with claim 1 wherein said shaft being held in operational alignment by holding means disposed and engaging a groove in the upper extremity of the smaller diameter region of said shaft and bears against a thrust means abutting the upper end face of an internal tubular section of said housing.

* * * * *